(12) United States Patent
Castorina et al.

(10) Patent No.: US 9,850,102 B2
(45) Date of Patent: Dec. 26, 2017

(54) DEVICES AND METHODS FOR HANDLING RADIUS FILLERS

(71) Applicant: The Boeing Company, Chicago, IL (US)

(72) Inventors: Elise Rae Ermitano Castorina, Shoreline, WA (US); Gabriel Zane Forston, Lake Stevens, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/499,706

(22) Filed: Apr. 27, 2017

(65) Prior Publication Data
US 2017/0233226 A1   Aug. 17, 2017

Related U.S. Application Data

(63) Continuation-in-part of application No. 14/518,754, filed on Oct. 20, 2014, now Pat. No. 9,637,354.

(51) Int. Cl.
*B66C 1/00*   (2006.01)
*B66C 1/28*   (2006.01)
*B66C 1/62*   (2006.01)

(52) U.S. Cl.
CPC ..................................... *B66C 1/28* (2013.01)

(58) Field of Classification Search
CPC .... B66C 1/32; B66C 1/16; B66C 1/62; B66C 1/28; E21B 19/07; E21B 7/046; E04H 17/265; B66F 3/24; F16L 1/06
See application file for complete search history.

(56) References Cited

U.S. PATENT DOCUMENTS

| | | | |
|---|---|---|---|
| 6,709,538 | B2 | 3/2004 | George et al. |
| 8,029,036 | B2 | 10/2011 | Kline et al. |
| 8,540,833 | B2 | 9/2013 | Deobald et al. |
| 2014/0216638 | A1 | 8/2014 | Vetter et al. |

OTHER PUBLICATIONS

John Melilli, "Applying Automation to the Fabrication of Composite-Based Aerospace Parts", JEC Magazine #56, Apr. 2010. Downloaded from jeccomposites.com on Oct. 14, 2014.

*Primary Examiner* — Stephen Vu
(74) *Attorney, Agent, or Firm* — Dascenzo Intellectual Property Law, P.C.

(57) ABSTRACT

Devices and methods for handling uncured radius fillers are disclosed. The devices, i.e., radius filler transport tools, generally are configured to load a radius filler from above, to index the radius filler to a desired location (e.g., a cavity), and to downwardly unload (e.g., drop) the radius filler at the desired location. Radius filler transport tools comprise at least two trough portions, coupled together to form a trough to carry the radius filler, and a plurality of hanger assemblies configured to transversely span the trough. The radius filler transport tool may have a transport state, where the trough and the hanger assemblies are in closed states, a load state, where the trough is in the closed state and at least one hanger assembly is in an open state, and an unload state, where the trough is in an open state and the hanger assemblies are in closed states.

13 Claims, 8 Drawing Sheets

so as to maintain acceptable quality for the radius fillers' intended application.

DEVICES AND METHODS FOR HANDLING RADIUS FILLERS

RELATED APPLICATION

This application claims priority to U.S. patent application Ser. No. 14/518,754, entitled "DEVICES AND METHODS FOR HANDLING RADIUS FILLERS," which was filed on Oct. 20, 2014, the complete disclosure of which is hereby incorporated by reference for all purposes.

FIELD

The present disclosure relates to devices and methods for handling radius fillers.

BACKGROUND

Fiber-reinforced composite structures often include a sheet structure in which layers of a composite material, such as a pre-impregnated (or prepreg) material, may be bent, wrapped, and/or otherwise extended between a first plane, or surface, and a second plane, or surface. The finite thickness and/or mechanical stiffness of the sheets of composite material result in a finite bend, or radius of curvature, in a transition region between the first surface and the second surface; and, in some geometries, this finite radius of curvature results in a cavity (e.g., a void space) between adjacent sheets of composite material.

This cavity may be filled with, or otherwise occupied by, a filler material, such as a radius filler, which also may be referred to as a noodle. The radius filler may be configured to provide mechanical support to the sheets of composite material that are proximal thereto and/or to decrease a potential for distortion of the sheets of composite material while the composite structure is curing.

Before curing the composite structure with a radius filler, the uncured radius filler needs to be transported to and placed into the cavity between the adjacent sheets of composite material. Radius fillers may be long, e.g., 1-40 m (meters) or more, with a relatively small cross section, e.g., a cross sectional area on the order of 1 cm$^2$ (square centimeters), e.g., 0.1-10 cm$^2$. Such long and/or thin radius fillers may be very easily twisted, kinked, and/or warped. Conventional methods of transporting radius fillers include hand manipulation and/or carrying (with multiple individuals, each managing a different section), sometimes augmented by long carts. Once the radius filler is brought to its destination (the location of the cavity between the composite sheets), the radius filler typically is manually placed into the cavity (with multiple individuals, each managing a different section). Particularly long radius fillers present significant challenges when manipulated, maneuvered, and installed due to difficulty in coordinating multiple individuals and the varying skill of multiple individuals while avoiding warping, kinking, and/or twisting so as to maintain acceptable quality for the radius fillers' intended application.

SUMMARY

Devices and methods for handling uncured radius fillers are disclosed herein. The devices, i.e., radius filler transport tools, comprise at least two trough portions, coupled together to form a trough, and a plurality of hanger assemblies configured to transversely span the trough. The trough portions each include a support rail and a base. Each support rail has a contact tip to contact and support the radius filler between the contact tips of the two trough portions. The trough has a closed state, where the contact tips are separated by a retention gap that is sized to retain a tip of the radius filler between contact tips, and an open state, where the contact tips are separated by a clearance gap that is greater than the retention gap and that is sized to permit the radius filler to exit the trough through the clearance gap. Further, each hanger assembly includes at least two arms, each arm coupled to a different trough portion. Each hanger assembly has a closed state, where the arms are coupled together and to the corresponding trough portion to span the trough, and an open state, where at least one arm is released from at least one of the corresponding trough portion and the other arms.

The radius filler transport tool generally is configured to load a radius filler from above, to index (e.g., to transport and/or to align) the radius filler to a desired location (e.g., a cavity), and to downwardly unload (e.g., drop) the radius filler at the desired location. Further, the radius filler transport tool may have a transport state, where the trough is in the closed state and the hanger assemblies are in closed states, a load state, where the trough is in the closed state and at least one hanger assembly is in the open state, and an unload state, where the trough is in the open state and the hanger assemblies are in closed states.

Methods for handling uncured radius fillers comprise loading the uncured radius filler into a radius filler transport tool by placing the uncured radius filler into the radius filler transport tool from above and subsequently unloading the uncured radius filler from the radius filler transport tool by dropping the uncured radius filler from the radius filler transport tool.

DESCRIPTION

Figure 1:
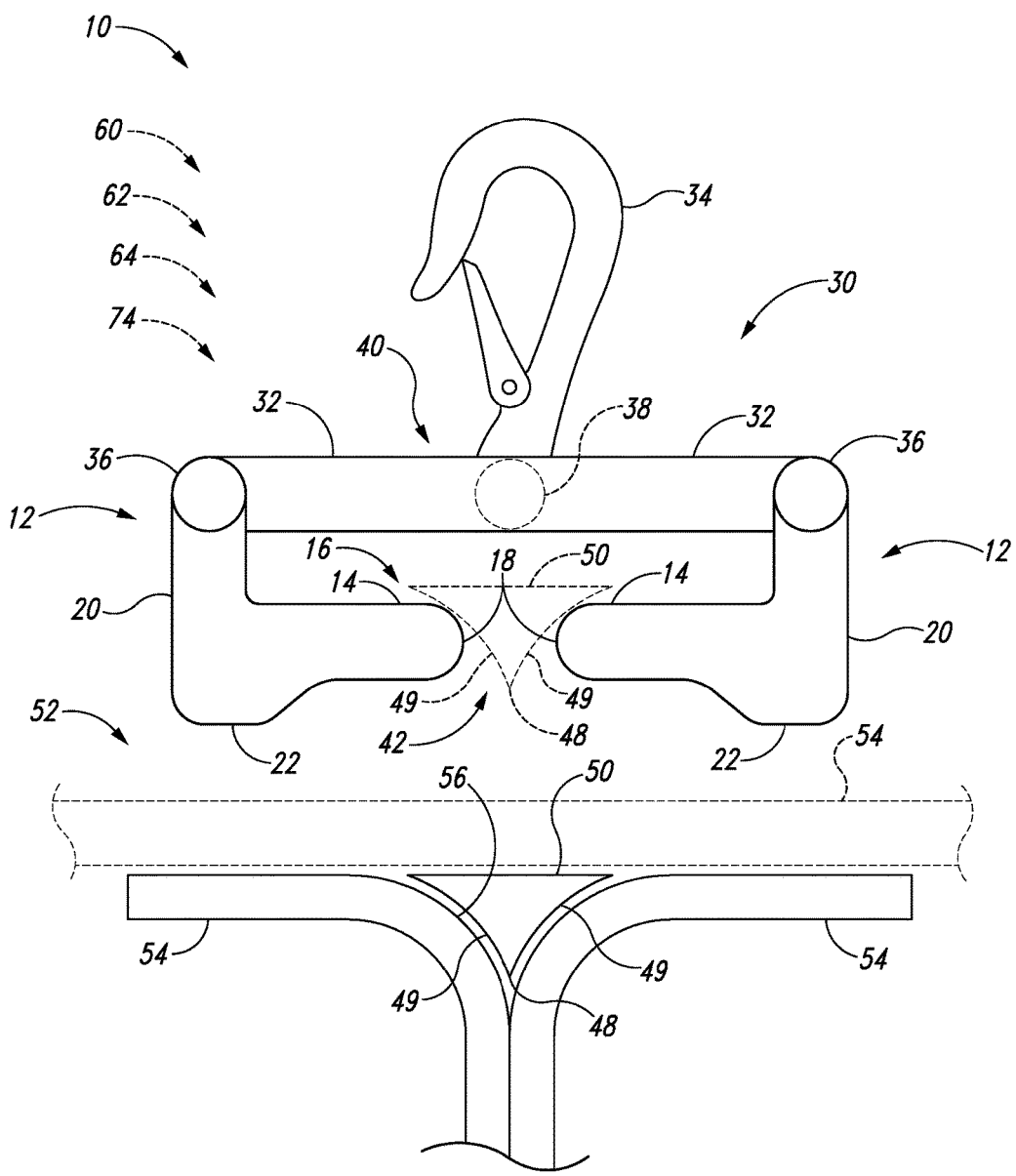
FIG. 1 is a schematic end-view representation of a radius filler transport tool aligned over a composite structure.

Devices and methods for handling uncured radius fillers are disclosed herein. In general, in the drawings, elements that are likely to be included in a given embodiment are illustrated in solid lines, while elements that are optional or alternatives are illustrated in dashed lines. However, elements that are illustrated in solid lines are not essential to all embodiments of the present disclosure, and an element shown in solid lines may be omitted from a particular embodiment without departing from the scope of the present disclosure. Elements that serve a similar, or at least substantially similar, purpose are labelled with numbers consistent among the figures. Like numbers in each of the figures, and the corresponding elements, may not be discussed in detail herein with reference to each of the figures. Similarly, all elements may not be labelled in each of the figures, but reference numerals associated therewith may be used for consistency. Elements, components, and/or features that are discussed with reference to one or more of the figures may be included in and/or used with any of the figures without departing from the scope of the present disclosure.

FIG. 1 is a schematic end-view representation of a radius filler transport tool 10 aligned over a composite structure 52. Radius filler transport tool 10 generally is configured to load, to index (e.g., to transport and/or to align), and to unload an uncured radius filler 50 and may have corresponding load states 62, transport states 60, unload states 64, and/or tool recovery states 74. Radius filler transport tool 10 is configured to load the uncured radius filler 50 from above through a reconfigurable radius filler entrance 40, and to unload the uncured radius filler 50 downwardly through a reconfigurable radius filler exit 42.

The composite structure 52 has a cavity 56 to be filled by the uncured radius filler 50. Composite structures 52 are substantially composed of fiber-reinforced composite materials, i.e., materials that include reinforcement fibers such as carbon fiber, glass fiber, and/or polyamide fiber. The fibers may be in the form of a tow, a weave, a knit, a fabric, and/or a felt. Fiber-reinforced composite materials also include a resin such as an epoxy, a thermoset material, and/or a thermoplastic material. When the resin is in an incompletely cured state, the fiber-reinforced material is said to be uncured. Various apparatuses, including aerospace apparatuses, may be at least partially constructed of composite structures. For example, composite structures may form at least a part of a stringer, a spar, a rib, a frame, an airframe, a fuselage, a wing, an empennage, an airfoil, and/or a rotor blade. Further, other apparatuses may include composite structures, such as spacecraft, watercraft, land vehicles, wind turbines, structural towers and masts, etc.

One or more components of the composite structure 52 may be in the form of a composite sheet 54 and may include layers, plies, and/or laminae. Composite sheets 54 may contact other composite sheets 54 of the composite structure 52 at a joint, bend, or other interface. At these interfaces, composite sheets 54, or other composite components, may bend and/or terminate, defining the cavity 56 (e.g., a void space, a gap, and/or a crevice) between adjoining components, owing at least partially to the finite thickness and/or radius of curvature of the components. For example, composite stringers (e.g., T-profile, I-profile, and/or hat profile) may define the cavity 56 between portions of the stringer and/or between the stringer and the supported composite component (e.g., a sheet, panel, and/or skin). As another example, lap joints (where one sheet of material is layered over another sheet of material) may define the cavity 56 at the edge of one of the layered sheets.

Composite structures 52 may be quite large and/or long, and interfaces in the composite structures 52 may substantially span the composite structure 52. Hence, cavities 56 may be long and/or narrow (in FIG. 1, the longitudinal direction is perpendicular to the page). For example, cavities 56 may be longer than 1 m, longer than 2 m, longer than 3 m, longer than 4 m, longer than 5 m, longer than 10 m, longer than 20 m, longer than 30 m, and/or longer than 40 m, and/or may have a transverse width of less than 10 cm, less than 5 cm, less than 2 cm, and/or less than 1 cm.

The cavity 56 may be filled by the uncured radius filler 50 (also called a noodle). The uncured radius filler 50 includes a resin and/or adhesive and generally is a composite material such as fiber-reinforced materials. The uncured radius filler 50 is formed to substantially match the shape of the designated cavity 56. The uncured radius filler 50 has a tip 48 that generally fits into the bottom of the designated cavity 56. The uncured radius filler 50 has radius edges 49 that meet at tip 48 and that are shaped and configured to contact composite sheets 54 and/or other components of composite structure 52 that define cavity 56. Though radius edges 49 generally have a curved profile (as seen in the end view of FIG. 2), the profile of radius edges 49 may be straight, linear, curved, and/or composed of linear and/or curved segments.

Typically, the uncured radius filler 50 is sized and configured to fill substantially the full length of the cavity 56. Hence, the uncured radius filler 50 may be too long to be conveniently handled by one person without tools (e.g., too long to be handheld) and may be longer, and/or substantially longer, than an arm span. The uncured radius filler 50 typically is long and/or narrow, for example, with a length that is longer than 1 m, longer than 2 m, longer than 3 m, longer than 4 m, longer than 5 m, longer than 10 m, longer than 20 m, longer than 30 m, and/or longer than 40 m, and, for example, with a cross sectional area that is less than 10 $cm^2$, less than 3 $cm^2$, less than 2 $cm^2$, less than 1 $cm^2$, less than 0.5 $cm^2$, less than 0.2 $cm^2$, greater than 0.1 $cm^2$, greater than 0.2 $cm^2$, and/or greater than 0.5 $cm^2$. The tip 48 of the uncured radius filler 50 is sized to fit into the designated cavity 56 and may have a width of less than 10 mm, less than 3 mm, less than 1 mm, greater than 0.01 mm, and/or greater than 0.1 mm. Uncured radius fillers 50 may have a maximum transverse width (in the end view of FIG. 1) corresponding to the transverse width of the designated cavity 56, i.e., a transverse width of less than 10 cm, less than 5 cm, less than 2 cm, and/or less than 1 cm.

The uncured radius filler 50 may be placed in the cavity 56 while the components that define the cavity 56 are uncured, with radius edges 49 contacting the uncured composite sheets 54 or other components that define the cavity 56. Subsequently, the uncured composite structure 52, including the uncured components (e.g., uncured composite sheets 54) and uncured radius filler 50 may be cured concurrently. The uncured radius filler 50, as with uncured composite materials in general, is flexible and, owing to the uncured state, is generally sticky (e.g., susceptible to contamination and sticking to surfaces). Placing the uncured radius filler 50 into the cavity 56 defined by uncured components is susceptible to unintended warping, kinking, and/or twisting of the uncured radius filler 50.

Figure 2:
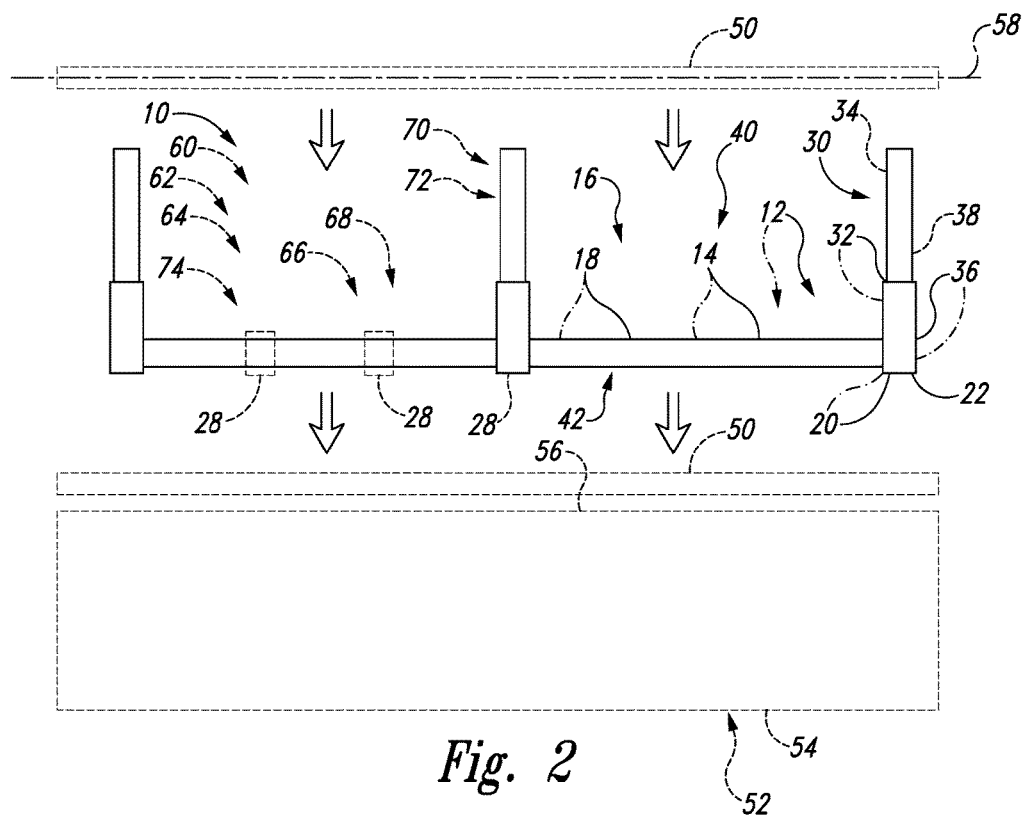
FIG. 2 is a schematic side-view representation of a radius filler transport tool.

FIG. 2 is a schematic side-view representation of the radius transport tool 10. In FIG. 2, the longitudinal direction is indicated by the system longitudinal axis 58. With reference to FIGS. 1-2, radius filler transport tool 10 comprises at least two trough portions 12 that together may form a trough 16. Generally, trough portions 12 are aligned parallel to each other with generally one trough portion 12 (or a first group of trough portions 12) forming one side of the trough 16 and another trough portion 12 (or a second group of trough portions 12) forming the other side of the trough 16. Trough portions 12 are configured to be aligned along the length of cavity 56. In such configuration, trough portions 12 are on either side of cavity 56, straddling cavity 56. FIG. 2 is a side view, with just one of the trough portions 12 visible;

hidden trough portions 12 and other components are schematically indicated by dot-dash lead lines.

The trough 16 formed by the trough portions 12 is configured to hold the uncured radius filler 50, at least while the radius filler transport tool 10 is in the load state 62 and/or the transport state 60 (as discussed further herein). The trough 16 may be described as an elongated channel, cradle, and/or receptacle with an open top. The radius filler transport tool 10, the trough 16, and/or the trough portions 12 may be elongated like the uncured radius filler 50 and the cavity 56, e.g., having a length of longer than 1 m, longer than 2 m, longer than 3 m, longer than 4 m, longer than 5 m, longer than 10 m, longer than 20 m, longer than 30 m, and/or longer than 40 m.

Each trough portion 12 includes a support rail 14 and a base 20. When the trough portions 12 are placed together to form the trough 16, the support rails 14 form the sides and/or bottom of the trough 16. The support rails 14 may be referred to as support rods, support panels, trough supports, channel supports, etc. (e.g., trough rails, trough panels, channel rods, and/or channel rails).

Each trough portion 12 may independently include a plurality of support rails 14. For example, a group of the support rails 14 for one trough portion 12 may be arranged end to end to form an elongated support rail assembly. Individual support rails 14 and/or support rail assemblies may be longer than 0.5 m, longer than 1 m, longer than 2 m, longer than 3 m, longer than 4 m, longer than 5 m, shorter than 5 m, shorter than 4 m, shorter than 3 m, shorter than 2 m, and/or shorter than 1 m. Support rails 14 may be configured to retain an elongated shape when supported in a spaced apart manner (i.e., with spaced apart supports). Support rails 14 may be adapted and/or designed for longitudinal rigidity, e.g., composed essentially of structural materials and/or including ridges, ribs, flanges, and/or braces. For example, support rails 14 may be in the form of hollow or solid rods. Suitable materials for support rails 14 include plastic, polyethylene, UHMW (ultra-high molecular weight) polyethylene, metal, aluminium, fluoropolymer, PTFE (polytetrafluoroethylene), FEP (fluorinated ethylene propylene), EFTE (ethylene tetrafluoroethylene), and silicone.

Each support rail 14 includes a contact tip 18. The contact tip 18 is configured to contact the uncured radius filler 50 and to form the side and/or bottom of the trough 16. The contact tips 18 of the trough 16 may be collectively configured and/or arranged to hold a range of sizes and/or shapes of uncured radius fillers 50. The contact tip 18 typically has a radius, bevel, or other surface configured to support and/or mate with the radius edges 49 of the uncured radius filler 50. In the trough 16, the contact tips 18 may have an inward slope such that the contact tips 18 of opposite sides of the trough 16 are closer together at the bottom of the trough 16 than above the bottom of the trough 16. The inward slope may support the uncured radius filler 50 in a stable and/or gentle manner. The inward slope may facilitate a gentle and/or guided drop out of the bottom of the trough 16 as the contact tips 18 are separated. As an example shape, the support rail 14 may be a rod with a circular profile and the contact tip 18 a portion of the circumference of the rod. The radius of curvature of the contact tip 18 (e.g., the radius of the rod) may be greater than 1 mm, greater than 2 mm, greater than 5 mm, less than 50 mm, less than 20 mm, and/or less than 10 mm.

The contact tips 18 (and/or one or more of the support rails 14) may be configured for non-damaging contact and/or non-damaging sliding contact with uncured composite materials such as the uncured radius filler 50. The contact tips 18 may be configured to avoid sticking to, contaminating, and/or otherwise negatively impacting the uncured radius filler 50. Non-damaging contact with the uncured radius filler 50 includes causing little or no contamination (e.g., due to transfer from the contact tip 18 to the uncured radius filler 50), distortion (e.g., warping, stretching) when the contact tip 18 moves relative to the uncured radius filler 50, and/or harm (e.g., due to sticking, pinching, scratching, etc.) of the uncured radius filler 50. Contact tips 18 (and/or one or more of the support rails 14) may include and/or may be a non-stick material (e.g., an oleophobic, a lipophobic, and/or a hydrophobic material), an unreactive material, and/or an inert material. Additionally or alternatively, contact tips 18 may include a release coating, a release film, and/or a dry release surface (e.g., a film, coating, and/or surface of PTFE, FEP, EFTE, and/or silicone).

The bases 20 of the trough portion 12 generally are spaced apart along the length of the trough portion 12 and/or the radius filler transport tool 10. The bases 20 may be separated along the longitudinal direction (as indicated by the system longitudinal axis 58 in FIG. 2) by support rails 14 and/or support beams 24. As described further herein, support rails 14 form a portion of the trough 16. Support beams 24, when present, couple the bases 20 together to form structural support for the respective trough portion 12. The spacing of the bases 20 of each trough portion 12 may be characterized by an average spacing. Each trough portion 12 may have bases 20 spaced at the same average spacing and may have two or more bases 20 spaced to align with bases 20 of another trough portion 12. For example, the bases 20 of two trough portions 12 may be spaced with the same spacing such that each base 20 of one trough portion 12 aligns with a corresponding base 20 of the other trough portion 12 when the trough portions 12 are positioned to form the trough 16. Bases 20 along the respective trough portion 12 (i.e., adjacent bases 20) may be separated and/or spaced apart by at least 0.2 m, at least 0.5 m, at least 1 m, at least 2 m, about 0.5 m, about 1 m, at most 10 m, at most 5 m, at most 2 m, and/or at most 1 m. Bases 20 may be spaced along the respective trough portion 12 symmetrically and/or uniformly (e.g., at a regular interval).

Bases 20, individually and/or collectively, are configured to stably rest on a surface such as the composite structure 52 and configured to support the trough portions 12 on the surface. The radius filler transport tool 10 may be configured to stably rest on a flat surface with at least one base 20 of each trough portion 12 contacting the flat surface. The trough portions 12 may be configured to slide together and/or apart by sliding on the bases 20 (e.g., sliding transverse to the system longitudinal axis 58). Hence, the bases 20 may be configured to slide across surfaces such as the composite structure 52 and/or composite sheets 54. The bases 20 may be configured for non-damaging contact and/or non-damaging sliding contact with uncured composite materials such as a composite structure 52 and/or composite sheets 54.

Each base 20 may include a foot 22 (e.g., at the bottom of the base 20 and/or the radius filler transport tool 10), with each foot 22 optionally configured for non-damaging contact and/or non-damaging sliding contact with uncured composite materials such as composite structure 52 and/or composite sheets 54. Additionally or alternatively, the bases 20, the support rails 14, and/or the support beams 24 may include rollers 28 configured to roll over a surface rather than rest and/or slide. Rollers 28, when present, generally are configured to translate the corresponding trough portion 12 transversely (substantially perpendicular to the longitudinal direction of the radius filler transport tool 10).

Feet 22 and/or optional rollers 28 may include, and/or may be, a non-stick material (e.g., an oleophobic, a lipophobic, and/or a hydrophobic material). Suitable materials for bases 20, feet 22, and/or rollers 28 include plastic, polyethylene, UHMW polyethylene, metal, aluminium, fluoropolymer, PTFE, FEP, EFTE, and silicone. Additionally or alternatively, feet 22 and/or rollers 28 may include a release coating, a release film, and/or a dry release surface (e.g., a film, coating, and/or surface of PTFE, FEP, EFTE, and/or silicone).

Radius filler transport tool 10 also comprises a plurality of hanger assemblies 30 that are configured to couple to the trough portions 12 and to transversely span the trough 16 in at least the transport state 60. The plurality of hanger assemblies 30 is configured to hang (i.e., support from above) the radius filler transport tool 10 in at least the transport state 60 and the tool recovery state 74. The plurality of hanger assemblies 30 also is configured to couple the trough portions 12 together to form the trough 16 (e.g., in the transport state 60). The plurality of hanger assemblies 30 is configured to provide the sole support for the radius filler transport tool 10 while the radius filler transport tool 10 is hanging by the plurality of hanger assemblies 30.

Hanger assemblies 30 generally are configured to couple to the bases 20 of the trough portions 12. Generally, one hanger assembly 30 is configured to couple to one trough portion 12 (at one of the bases 20) and to another trough portion 12 (at one of the bases 20). Hence, the hanger assemblies 30, like the bases 20, generally are spaced apart along the length of the radius filler transport tool 10. The radius filler transport tool 10 may include one hanger assembly 30 for each aligned pair of bases 20 or may include fewer hanger assemblies 30 than aligned pairs of bases 20. The hanger assemblies 30 are typically independent elements that when coupled to the respective trough portion(s) 12 may be separated along the longitudinal direction (as indicated by the system longitudinal axis 58 in FIG. 1) by the structure of the respective trough portion(s) 12. The spacing of the hanger assemblies 30 when coupled to the trough portions 12 may be characterized by an average spacing. The spacing (and/or the average spacing) of the hanger assemblies 30 may be the same as the bases 20 of the respective trough portions 12 (e.g., one hanger assembly 30 for each aligned pair of bases 20). Hanger assemblies 30 coupled to the trough portions 12 may be separated and/or spaced apart by at least 0.2 m, at least 0.5 m, at least 1 m, at least 2 m, about 0.5 m, about 1 m, at most 10 m, at most 5 m, at most 2 m, and/or at most 1 m. Hanger assemblies 30 may be spaced along the radius filler transport tool 10 symmetrically and/or uniformly (e.g., at a regular interval).

Each hanger assembly 30 includes at least two arms 32, with one arm 32 configured to couple the hanger assembly 30 to at least one trough portion 12, and with another arm 32 configured to couple the hanger assembly 30 to another trough portion 12. At least one arm 32 is configured to releasably couple to the trough portion 12 and/or another arm 32. Each arm 32 independently may pivotably couple to the corresponding trough portion 12.

Hanger assemblies 30 may include an arm coupler 36 for each arm 32. When present, the arm couplers 36 are configured to couple the corresponding arm 32 of the hanger assembly 30 to at least one of the trough portions 12. Arm couplers 36 are configured to couple the corresponding arm 32 and trough portion 12 together and may be configured for a pivotal coupling between the arm 32 and the trough portion 12. The pivotal coupling between the arm 32 and the trough portion 12 allows the trough portion 12 to rotate with respect to the coupled arm 32 while the two components remain coupled. Arm couplers 36 may include, and/or may be, a pin, a clamp, a clasp, a bolt, a hinge, a magnet, an actuator, a hook, a ring, a carabiner, a link, a loop, and/or an eyelet. At least one arm coupler 36, and optionally each arm coupler 36, may be configured to be releasable. If all arm couplers 36 are released, uncoupled, and/or removed, the hanger assembly 30 is free of the trough portions 12 and the trough 16, and may be removed from the radius filler transport tool 10, fully exposing the top of the trough 16 and the radius filler entrance 40. If at least one arm coupler 36 remains coupled to the corresponding arm 32 and trough portion 12, the hanger assembly 30 may pivot about that arm coupler 36 and rotate away from the trough 16, fully exposing the top of the trough 16 and the radius filler entrance 40.

Hanger assemblies 30 may include a central hanger coupler 38 that couples at least two arms 32 of the hanger assembly together, specifically two arms 32 that are each configured to be coupled to a different trough portion 12. The central hanger coupler 38 may be releasable. When the central hanger coupler 38 is released, uncoupled, and/or removed, the coupled arms 32 of the hanger assembly 30 are free to separate from each other. In such a case, the arms 32 may be rotated away from the trough 16 to fully expose the top of the trough 16 and the radius filler entrance 40. Central hanger couplers 38 may include, and/or may be, a pin, a clamp, a clasp, a bolt, a hinge, a magnet, an actuator, a hook, a ring, a carabiner, a link, a loop, and/or an eyelet.

Hanger assemblies 30 may include a hanging coupler 34 which is configured to releasably couple the hanger assembly 30 to a transport mechanism above the radius filler transport tool 10 and/or configured to hang the radius filler transport tool 10 from above. Hanging couplers 34 may include, and/or may be, a hook, a ring, a carabiner, a link, a catch, a clasp, a grapple, a loop, a strap, a tether, and/or an eyelet. Though the examples of FIGS. 1 and 4-8 illustrate the optional hanging coupler 34 as a hook suitable to attach to a cable, strap, loop, ridge, etc., hanging assemblies 30 do not require any specific hanging coupler 34. Hanging assemblies 30 may omit the hanging coupler 34 and yet still be hung by hook, cable, strap, loop, etc. of a transport mechanism such as an overhead crane, mobile transport cart, etc.

The radius filler transport tool 10, the trough 16, the trough portions 12, and/or the support rails 14 are, collectively and/or individually, rigid enough to maintain the assembled trough 16 while hanging by the hanger assemblies 30 and/or rigid enough to maintain the uncured radius filler 50 in the trough 16 without significant warping, kinking, and/or twisting of the uncured radius filler 50 while hanging by the hanger assemblies 30. Though the trough 16, the trough portions 12, and/or the support rails 14 are generally longitudinally rigid, these elements may be flexible enough to conform to the underlying contour of the composite structure 52 in the longitudinal direction.

Figure 3:
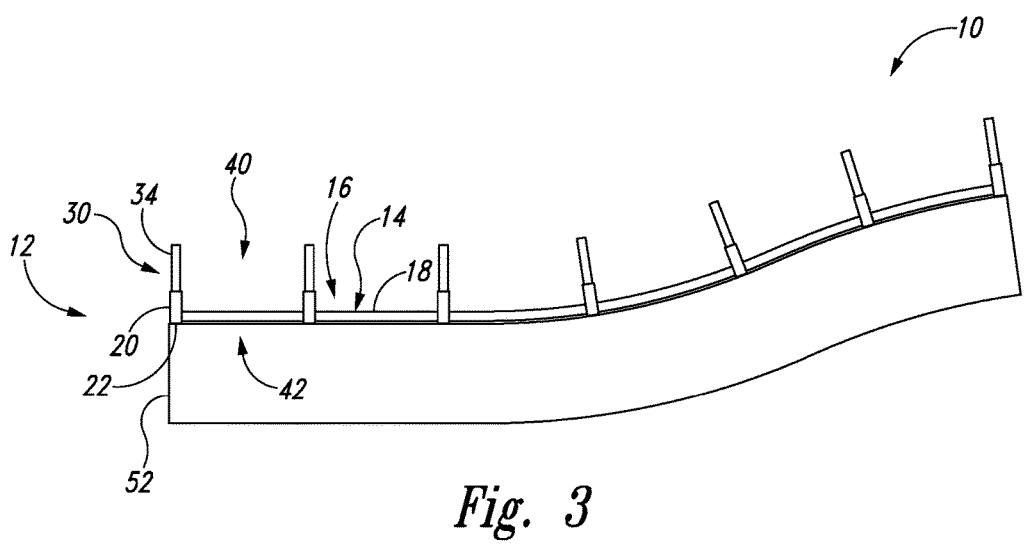
FIG. 3 is a schematic side-view representation of a radius filler transport tool positioned along a composite structure with a contour.

As schematically illustrated in FIG. 3, the composite structure 52 may not be entirely flat and may have a gentle contour, e.g., surface curves with a radius of curvature greater than 0.5 m, greater than 1 m, greater than 2 m, and/or greater than 5 m. The trough 16, the trough portions 12, and/or the support rails 14 may conform to and/or drape across the contour of the composite structure 52 such that the bases 20 may contact the composite structure 52, straddling the cavity 58 to be filled by the uncured radius filler 50 for the length of the cavity 58.

Figure 6:
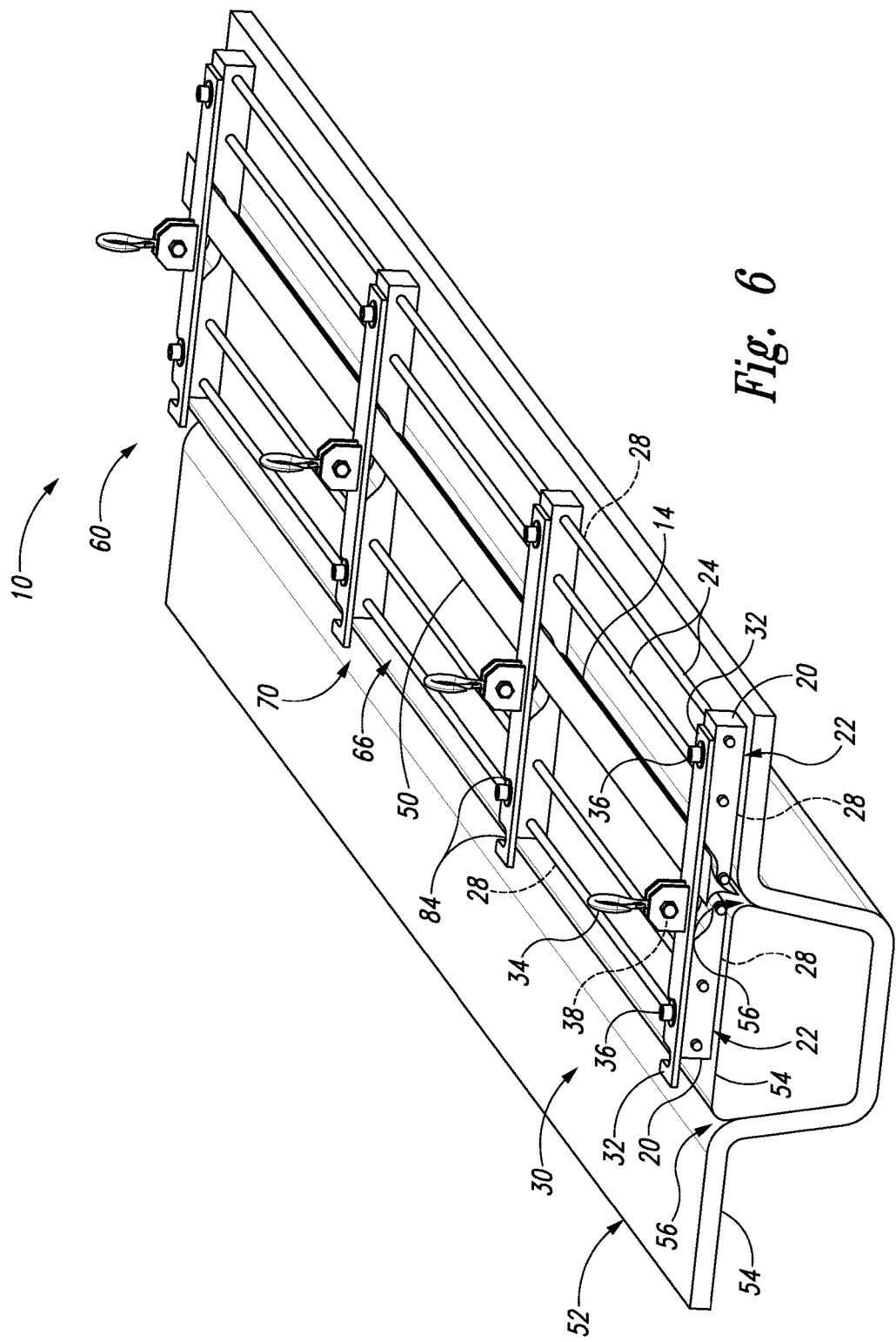
FIG. 6 is a perspective view of the radius filler transport tool of FIG. 4 in a transport state aligned with a cavity in a composite structure.
Figure 7:
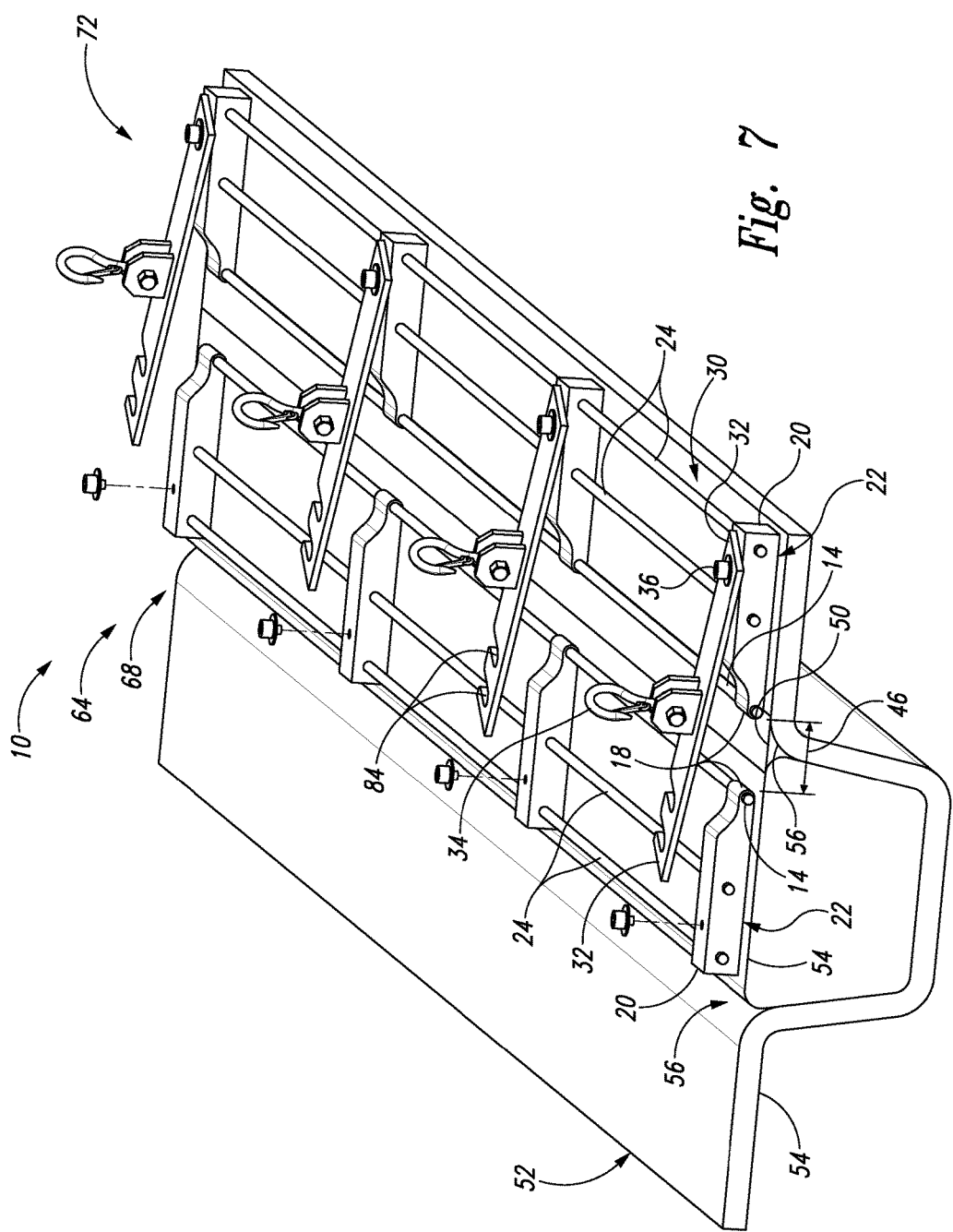
FIG. 7 is a perspective view of the radius filler transport tool of FIG. 4 in an unload state.
Figure 8:
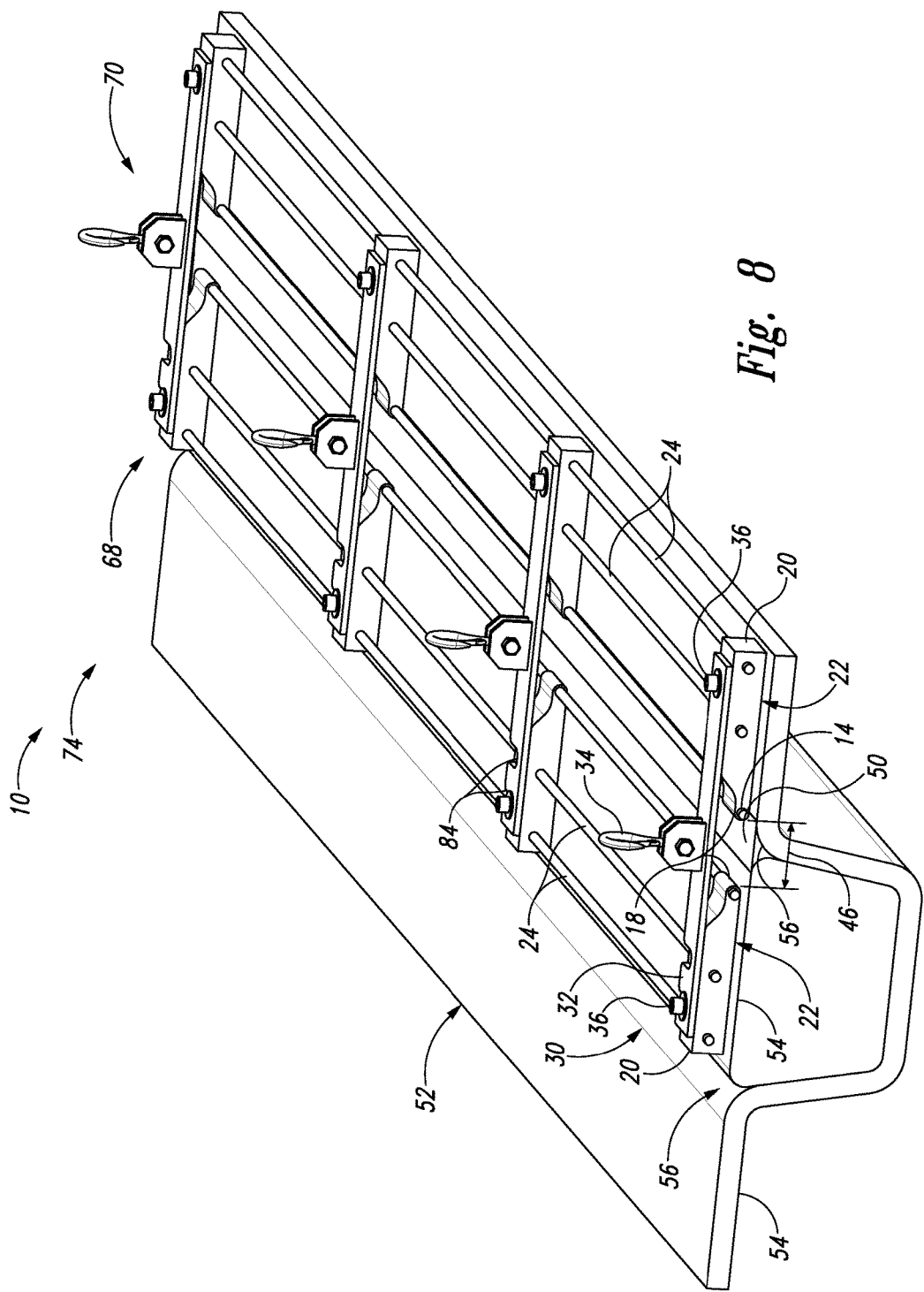
FIG. 8 is a perspective view of the radius filler transport tool of FIG. 4 in a tool recovery state.

The examples of FIGS. 4-8 illustrate the radius filler transport tool 10 in the load state 62 (FIG. 4), the transport state 60 (FIGS. 5-6), the unload state 64 (FIG. 7), and the tool recovery state 74 (FIG. 8). FIGS. 4-8 illustrate the use of the radius filler transport tool 10 to index the uncured radius filler 50 into the cavity 56. Generally, these states may be characterized by the state of the trough 16 and the states of the hanger assemblies 30.

Figure 4:
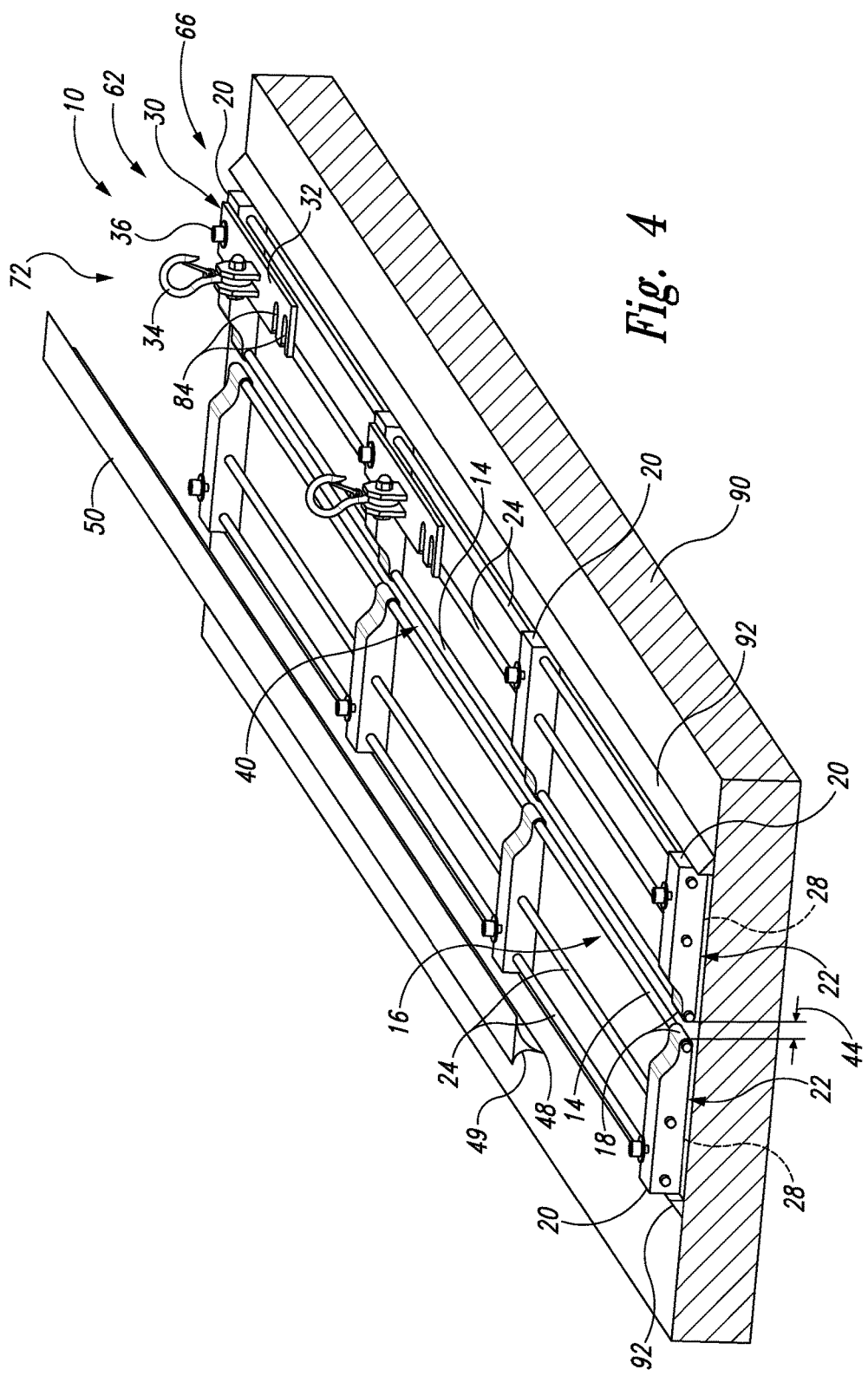
FIG. 4 is a perspective view of an example of a radius filler transport tool in a load state.
Figure 5:
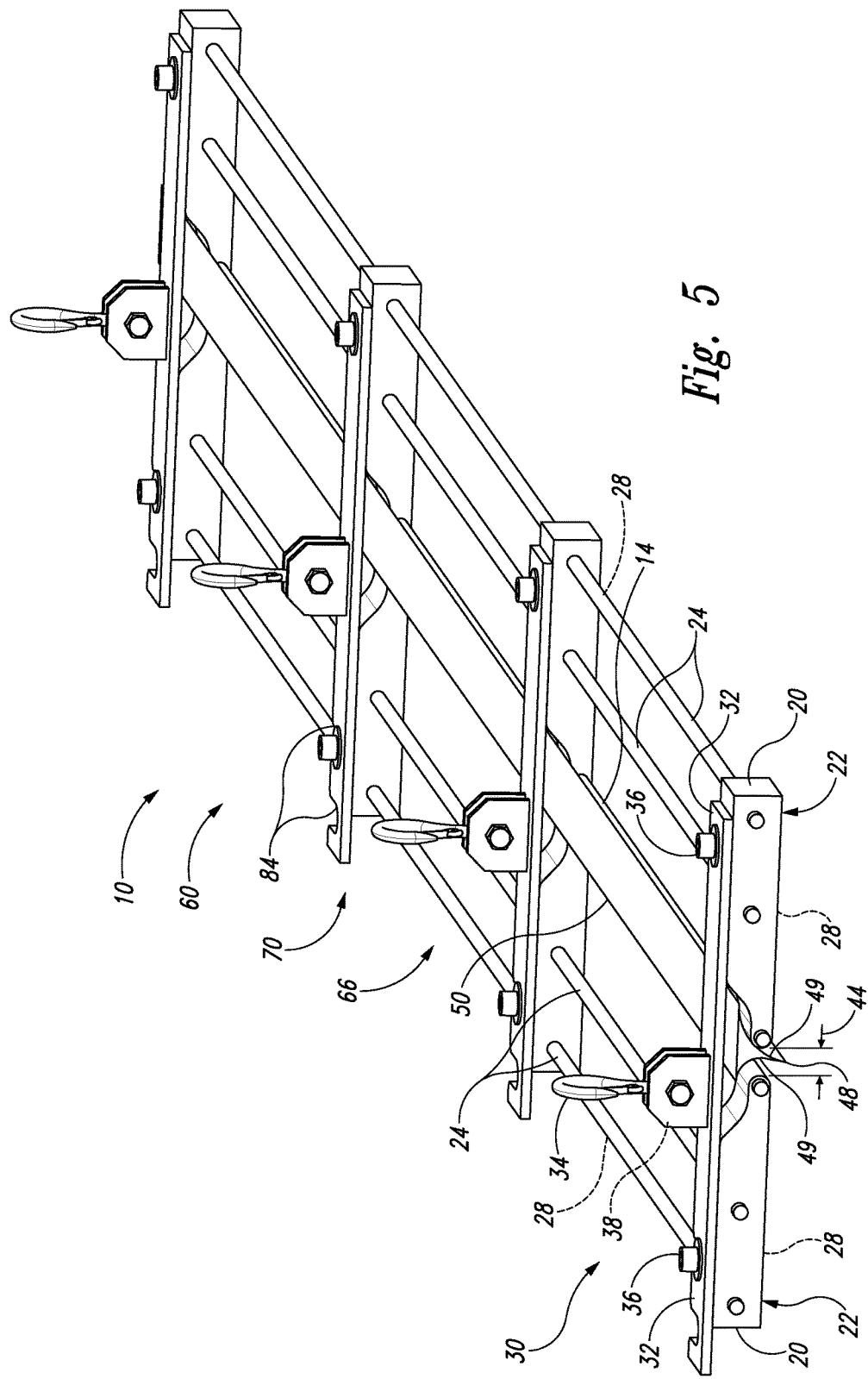
FIG. 5 is a perspective view of the radius filler transport tool of FIG. 4 in a transport state.

The trough has a trough closed state 66 and a trough open state 68. In the trough closed state 66, the trough 16 is configured to receive and/or to support the uncured radius filler 50. In the trough closed state 66, the trough portions 12 are positioned such that together they form a narrow trough 16. In the trough closed state 66, the trough 16 may have a closed bottom or an open bottom with a retention gap 44 (as shown in FIGS. 4-5). The retention gap 44 is a relatively narrow gap (as compared to the corresponding clearance gap 46 of the trough open state 68 as discussed further herein) between the trough portions 12 (specifically between contact tips 18 of the support rails 14). The retention gap 44 is sized to accept the tip 48 of the uncured radius filler 50. The retention gap 44 is narrower than the maximum width of the uncured radius filler 50. The retention gap 44 may have a width of less than 10 mm, less than 5 mm, less than 2 mm, greater than 0.1 mm, and/or greater than 1 mm.

In the trough closed state 66, the trough portions 12 that form the trough 16 may be releasably coupled together through one or more hanger assemblies 30. When the uncured radius filler 50 is assembled into the trough 16 in the trough closed state 66, the tip 48 of the uncured radius filler 50 faces the bottom of the trough 16, optionally with the tip 48 fit within the retention gap 44 of the trough 16 in the trough closed state 66. The contact tips 18 of the support rails 14 contact the radius edges 49 of the uncured radius filler 50.

In the trough open state 68, the trough is configured to permit the uncured radius filler 50 to unload from the trough 16 downwardly. In the trough open state 68, the trough portions 12 are positioned to form an open-bottom trough 16 with the clearance gap 46 (as shown in FIGS. 7-8). The clearance gap 46 is a relatively wide gap (as compared to the corresponding retention gap 44 of the trough closed state 66). The clearance gap 46 is wider that the maximum width of the uncured radius filler 50. The clearance gap 46 at the open bottom of the trough 16 in the trough open state 68 substantially defines the radius filler exit 42. That is, the uncured radius filler 50 in the trough 16 may (downwardly) exit the radius filler transport tool 10 through the open bottom of the trough 16 in the trough open state 68. The clearance gap 46 may have a width of greater than 0.5 cm, greater than 1 cm, greater than 2 cm, less than 20 cm, less than 10 cm, and/or less than 5 cm.

To transition between the trough closed state 66 and the trough open state 68, the trough portions 12 on opposite sides of the trough 16 may be translated transversely (substantially perpendicular to the system longitudinal axis 58) and/or rotated about an axis parallel to the system longitudinal axis 58. Transition between the trough closed state 66 and the trough open state 68 may involve decoupling and/or unlocking the hanger assemblies 30 with respect to at least one of the trough portions 12. Generally, transition between the trough closed state 66 and the trough open 68 may occur when the hanger assemblies 30 are in hanger open states 72 (as described further herein). The trough 16 may transition between the trough closed state 66 and the trough open state 68 one section at time by setting one or more corresponding hanger assemblies 30 into the hanger open state 72 and then moving (translating and/or rotating) the trough portions 12 with respect to one another.

Each hanger assembly 30 has a hanger closed state 70 and a hanger open state 72. In the hanger closed state 70, the hanger assembly 30 is coupled to opposing trough portions 12 (that form the trough 16 therebetween) and transversely spans the trough 16. In the hanger closed state 70, at least one arm 32 of the hanger assembly 30 is coupled to at least one trough portion 12, another arm 32 of the hanger assembly 30 is coupled to another trough portion 12, and the hanger assembly 30 transversely spans the trough 16.

In the hanger open state 72, the hanger assembly 30 is released from at least one of the trough portions 12. Additionally or alternatively, the hanger assembly 30 may be configured to separate while remaining coupled to one or more trough portions 12 such that opposing trough portions 12 are not coupled together by the hanger assembly 30 in the hanger open state 72. In the hanger open state 72, at least one arm 32 of the hanger assembly 30 is released from the corresponding trough portion(s) 12 and/or the arms 32 of the hanger assembly 30 are released from each other to permit access to the open top of the trough 16 from above. The radius filler entrance 40 is substantially defined by the open top of the trough 16 and the hanger assemblies 30 in the hanger open state 72. That is, the uncured radius filler 50 may be inserted into at least a portion of the trough 16 from above the radius filler transport tool 10 when the corresponding hanger assembly(ies) 30 is in the hanger open state 72.

To transition from the hanger closed state 70 to the hanger open state 72, at least one arm coupler may be released, uncoupled, and/or removed to release the respective arm 32 from the respective trough portion 12. Additionally or alternatively, to transition from the hanger closed state 70 to the hanger open state 72, the central hanger coupler 38 may be released, uncoupled, and/or removed, leaving the arms 32 of the hanger assembly 30 free to pivot and/or slide about the corresponding arm couplers 36.

As shown in the example of FIG. 4, the load state 62 is characterized by the trough 16 in the trough closed state 66 and one or more (e.g., all) hanger assemblies 30 in the hanger open state 72. The radius filler transport tool 10 in the load state 62 is configured to load the uncured radius filler 50 from above the radius filler transport tool 10 into the trough 16 through the radius filler entrance 40. The uncured radius filler 50 may be loaded into the trough 16 all at once (e.g., by previously setting all hanger assemblies 30 into the hanger open state 72). Alternatively, the uncured radius filler 50 may be loaded into trough 16 one section at a time by opening the respective hanger assembly 30, inserting the section of radius filler past the open hanger assembly 30, and then continuing for each hanger assembly 30. Hence, the radius filler transport tool 10 in the load state 62 may be configured to load a section of the uncured radius filler 50. Loading the uncured radius filler 50 may include setting each hanger assembly 30 into the hanger open state 72 before and/or during the placement of the uncured radius filler 50 into the trough 16. Before placing the uncured radius filler 50 into the trough 16, if the trough 16 is not in the trough closed state 66, the trough 16 may be set into the trough closed state 66.

The radius filler transport tool 10 in the load state 62 may be configured to accept the uncured radius filler 50 placed, dropped, and/or ejected into the trough 16 from above.

In the example of FIG. 4, the radius filler transport tool 10 is assembled on a preparation platform 90. The preparation platform 90 generally is a flat surface that is configured to support the entire radius filler transport tool 10 while loading the uncured radius filler 50, i.e., while the radius filler transport tool 10 is in the load state 62. The preparation platform 90 may have the length of the uncured radius filler 50 and/or the radius filler transport tool 10. The preparation platform 90 may be flat (planar) and/or may have the longitudinal contour of the composite structure 52 that defines the cavity 56. The preparation platform 90 may include one or more guide structures 92 (e.g., guide rails, grooves, spacers, markings, etc.) that are arranged to facilitate placement of the trough portions 12 into the trough closed state 66. The guide structures 92 may facilitate aligning the trough portions 12 such that the trough portions 12 are laterally separated and the retention gap 44 is formed at the bottom of the trough 16.

As shown in FIG. 4, once one or both of the arm couplers 36 are removed, the corresponding hanger assembly 30 may be pivoted away from the top of the trough 16 and/or removed, fully exposing the radius filler entrance 40 in that location. In FIG. 4, the far two hanger assemblies 30 are pivoted away from the top of the trough 16. The trough portions 12 have two near bases 20 configured to receive two more hanger assemblies 30 (hence, the two near hanger assemblies 30 may be said to be removed from the bases 20). Though all hanger assemblies 30 of FIG. 4 are in the hanger open state 72, generally, each hanger assembly 30 independently may be in the hanger closed state 70 or the hanger open state 72.

During and/or after loading the uncured radius filler 50 into the radius filler transport tool 10 in the load state 62, the radius filler transport tool 10 may be transitioned to the transport state 60 (by setting the hanger assemblies 30 into the hanger closed state 66). For example, during and/or after placement of the uncured radius filler 50 into the trough 16, each hanger assembly 30 may be set into the hanger closed state 70. As each hanger assembly 30 is set into the hanger closed state 70, that hanger assembly 30 is coupled (e.g., secured) to both trough portions 12 of the trough 16 (by connecting, replacing, etc.). When the hanger assemblies 30 are in the hanger closed state 70, the plurality of hanger assemblies 30 may be used to support the radius filler transport tool 10.

As shown in the example of FIG. 5, the transport state 60 is characterized by the trough in the trough closed state 66 and each of the hanger assemblies 30 in the hanger closed state 72. The radius filler transport tool 10 in the transport state 60 is configured to hold the uncured radius filler 50 in the trough 16 between at least two trough portions 12 (e.g., between two support rails 14).

In the example of FIG. 5 the radius filler transport tool 10 in a transport state 60 is carrying the uncured radius filler 50. In the transport state 60, hanger assemblies 30 are in the hanger closed state 70 and, thus, block a portion of the radius filler entrance 40 into the top of the trough 16. In this example, the radius filler transport tool 10 includes two trough portions 12. Further, four hanger assemblies 30, each coupled to both trough portions 12 and spanning the trough 16, are shown. Each hanger assembly 30 is coupled to each trough portion 12 with an arm coupler 36 (i.e., for each arm 32, one arm coupler 36 to couple the arm 32 to one trough portion 12). Each of the arm couplers 36 (each a bolt) are also releasable and removable. To transition one of the hanger assemblies 30 from the hanger closed state 70 (e.g., as shown in FIG. 5) to the hanger open state 72 (e.g., as shown in FIGS. 4 and 7), and, thus, to transition the radius filler transport tool 10 from the transport state 60 (FIG. 5) to the load state 62 (FIG. 4) and/or to the unload state 64 (FIG. 7), one or both of the arm couplers 36 may be removed.

Once in the transport state 60 with the uncured radius filler 50 loaded in the radius filler transport tool 10, the uncured radius filler 50 may be transported in the radius filler transport tool 10. As shown in the example of FIG. 6, the uncured radius filler 50 in the radius filler transport tool 10 may be moved to the proximity of a cavity 56 and aligned above the cavity 56. The radius filler transport tool 10 in the transport state 60 may be rested on the composite structure 52 as shown in FIG. 6. Additionally or alternatively, the radius filler transport tool 10 may be supported and/or hung above the cavity 56 by hanging the radius filler transport tool 10 by the plurality of hanger assemblies 30.

Once ready to unload the uncured radius filler 50, the radius filler transport tool 10 may be transitioned from the transport state 60 (FIG. 6) to the unload state 64 (FIG. 7) by transitioning the trough 16 from the trough closed state 66 to the trough open state 68. The trough 16 may be transitioned to the trough open state 68 by transitioning the hanger assemblies 30 from the hanger closed state 70 to the hanger open state 72. For example, for each hanger assembly 30, at least one arm 32 of the hanger assembly 30 may be decoupled and/or unlocked from at least one of the trough portions 12 such that the freed trough portion 12 may move relative to the other trough portion 12 to change the separation between the contact tips 18 of the trough portions 12 (i.e., to change the gap from the retention gap 44 to the clearance gap 46). The trough portions 12 may move by translation and/or rotation. Translation is generally transverse (i.e., substantially perpendicular to the system longitudinal axis 58). Rotation is generally about an axis parallel to the system longitudinal axis 58. The transition from the trough closed state 66 of the transport state 60 to the trough open state 68 of the unload state 64 may be while the radius filler transport tool 10 is suspended above the cavity 56 and/or while the radius filler transport tool 10 is in contact with the composite structure 52 that defines the cavity 56. For example, translation of the trough portions 12 while in contact with the composite structure 52 may include sliding the feet 22 or rollers 28 of the bases 20 across the composite structure 52.

As shown in the example of FIG. 7, the unload state 64 is characterized by the trough 16 in the trough open state 68 and one or more (e.g., all) hanger assemblies 30 in the hanger open state 72. The radius filler transport tool 10 in the unload state 64 is configured to downwardly unload the uncured radius filler 50 through the radius filler exit 42 at the bottom of the trough 16 in the trough open state 68. In FIG. 7, the uncured radius filler 50 has been unloaded and dropped into the cavity 56 below the radius filler transport tool 10.

The uncured radius filler 50 may be unloaded all at once (e.g., by setting all hanger assemblies 30 into the hanger open state 72 and spreading the trough 16 into the trough open state 68). Alternatively, the uncured radius filler 50 may be unloaded from the trough 16 one section at a time (e.g., sequentially) by opening the respective hanger assembly 30, spreading the corresponding section of the trough 16 into the trough open state 68 so that the section of the uncured radius filler 50 exits the trough 16, and then continuing for each hanger assembly 30 and corresponding section of the trough 16. Hence, the radius filler transport tool 10 in the unload state 64 may be configured to unload a section of the uncured radius filler 50. Unloading the uncured radius filler 50 a section at a time and/or sequentially may facilitate placement of long uncured radius fillers 50, placement over contoured composite structures 52, and/or inspection during placement.

The radius filler transport tool 10 in the unload state 64 may be configured to drop, eject, and/or place the uncured radius filler 50 from the trough 16 into the cavity 56 in the composite structure 52. When dropped, ejected, and/or placed, the uncured radius filler 50 generally moves from the trough 16 to the cavity 56 below the trough 16. To avoid stretching, twisting, kinking, and/or pulling the uncured radius filler 50 as it is dropped, ejected, and/or placed, the radius filler transport tool 10 may be configured to hold the uncured radius filler 50 close to and/or below the bottom of the radius filler transport tool 10 and/or the radius filler transport tool 10 may be configured to closely approach the cavity 56. The distance between the tip 48 of the uncured radius filler 50 in the trough 16 (in the trough closed state 66) and the top of the cavity 56 (i.e., the local plane of the composite structure 52 at the cavity 56) may be less than 20 mm, less than 10 mm, less than 5 mm, less than 2 mm, greater than 0.1 mm, greater than 0.5 mm, and/or greater than 1 mm. The unloading operation drops, ejects, and/or places the uncured radius filler 50 from the short height of the distance between the tip 48 of the uncured radius filler 50 and the top of the cavity 56.

As shown in the example of FIG. 8, the tool recovery state 74 generally is characterized by the trough in the trough open state 68 and one or more (e.g., all) hanger assemblies 30 in the hanger closed state 72. After unloading the uncured radius filler 50 into the cavity 56, the radius filler transport tool 10 may be removed from the cavity site on the composite structure 52 by transitioning one or more (typically a majority of all) of the hanger assemblies 30 from the hanger open state 72 to the hanger closed state 70 and then using the hanger assemblies 30 to lift the radius filler transport tool 10 from the composite structure 52. The hanger assemblies 30, the bases 20, and/or the trough portions 12 may be configured such that the hanger assemblies 30 may be coupled to the trough portions 12 while the trough 16 is in the trough closed state 66 (e.g., in the transport state 60 of the radius filler transport tool 10) and in the trough open state 68 (e.g., in the tool recovery state 74 of the radius filler transport tool 10). For example, one or more arms 32 of the hanger assembly 30 may have two different coupling sites for coupling the corresponding arm coupler 36, with each coupling site corresponding to one of the two trough states (i.e., the trough closed state 66 and the trough open state 68). As shown in the examples of FIGS. 4-8, the coupling sites may be a pair of longitudinal slots 84 (aligned generally in the longitudinal direction of the radius filler transport tool 10). As another example, one or more arms 32 of the hanger assembly 30 may have a transverse slot for the corresponding arm coupler 36 such that the respective trough portion 12 may be coupled in either of the two trough states through the same transverse slot.

Figure 9:
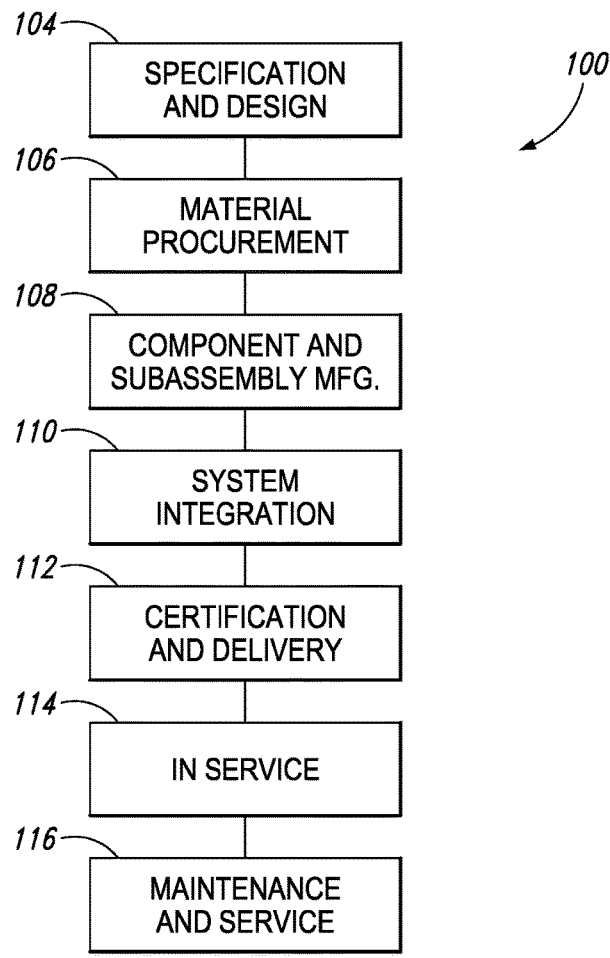
FIG. 9 is a flow diagram of aircraft production and service methodology.
Figure 10:
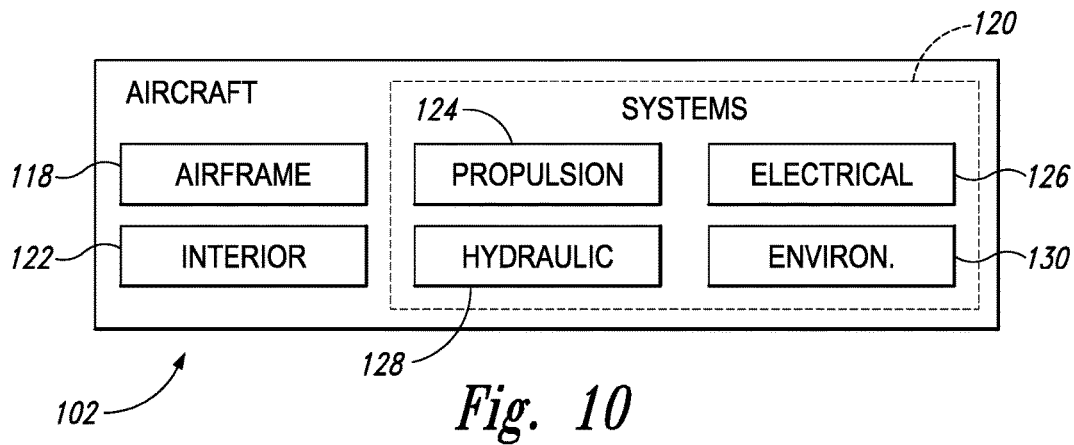
FIG. 10 is a block diagram of an aircraft.

Devices and methods of the present disclosure may be described in the context of an aircraft manufacturing and service method 100 as shown in FIG. 9 and an aircraft 102 as shown in FIG. 10. During pre-production, exemplary method 100 may include specification and design 104 of the aircraft 102 and material procurement 106. During production, component and subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 10, the aircraft 102 produced by exemplary method 100 may include an airframe 118 with a plurality of systems 120 and an interior 122. Examples of high-level systems 120 include one or more of a propulsion system 124, an electrical system 126, a hydraulic system 128, and an environmental system 130. Any number of other systems may be included. Although an aerospace example is shown, the principles of the invention may be applied to other industries, such as the automotive industry.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 102 is in service. Also, one or more apparatus embodiments, method embodiments, or a combination thereof may be utilized during the production stages 108 and 110, for example, by substantially expediting assembly of or reducing the cost of an aircraft 102. Similarly, one or more of apparatus embodiments, method embodiments, or a combination thereof may be utilized while the aircraft 102 is in service, for example and without limitation, to maintenance and service 116.

Examples of inventive subject matter according to the present disclosure are described in the following enumerated paragraphs.

A1. A radius filler transport tool comprising:
a first trough portion and a second trough portion that are configured to align to form a trough, wherein the first trough portion includes a support rail and a base, wherein the second trough portion includes a support rail and a base, wherein the support rail of the first trough portion has a first contact tip and the support rail of the second trough portion has a second contact tip, and wherein the first contact tip and the second contact tip are configured to contact a radius filler supported between the first contact tip and the second contact tip; and
a plurality of hanger assemblies configured to transversely span the trough, wherein each hanger assembly includes a first arm and a second arm, wherein the first arm is configured to couple the hanger assembly to the first trough portion, and wherein the second arm is configured to couple the hanger assembly to the second trough portion.

A1.1. The radius filler transport tool of paragraph A1, wherein the trough has a trough closed state and a trough open state, wherein, in the trough closed state, the first contact tip and the second contact tip are separated by a radius filler retention gap that is sized to retain a tip of an uncured radius filler between the first contact tip and the second contact tip, and wherein, in the trough open state, the first contact tip and the second contact tip are separated by a radius filler clearance gap that is greater than the radius filler retention gap and that is sized to permit the uncured radius filler to exit the trough through the radius filler clearance gap.

A1.2. The radius filler transport tool of any of paragraphs A1-A1.1, wherein each hanger assembly has a hanger closed state and a hanger open state, wherein, in the hanger closed state, the first arm is coupled to the first trough portion, the second arm is coupled to the second trough portion, and the hanger assembly transversely spans the trough, and wherein, in the hanger open state, the first arm is released from at least one of the first trough portion and the second arm.

A1.3. The radius filler transport tool of any of paragraphs A1-A1.2, wherein a/the uncured radius filler is longer than 1 m, longer than 2 m, longer than 3 m, longer than 4 m, longer than 5 m, longer than 10 m, longer than 20 m, longer than 30 m, and/or longer than 40 m.

A1.4. The radius filler transport tool of any of paragraphs A1-A1.3, wherein a/the uncured radius filler has a cross sectional area that is less than 10 $cm^2$, less than 3 $cm^2$, less than 2 $cm^2$, less than 1 $cm^2$, less than 0.5 $cm^2$, less than 0.2 $cm^2$, greater than 0.1 $cm^2$, greater than 0.2 $cm^2$, and/or greater than 0.5 $cm^2$.

A1.5. The radius filler transport tool of any of paragraphs A1-A1.4, wherein the uncured radius filler has a/the tip with a width of less than 10 mm, less than 3 mm, less than 1 mm, greater than 0.01 mm, and/or greater than 0.1 mm.

A2. The radius filler transport tool of any of paragraphs A1-A1.4, wherein the radius filler transport tool has a transport state configured to hold an/the uncured radius filler in the trough between the first contact tip and the second contact tip, wherein the transport state is defined by the trough in a/the trough closed state and each hanger assembly in a/the hanger closed state.

A3. The radius filler transport tool of any of paragraphs A1-A2, wherein the radius filler transport tool has a load state configured to load an/the uncured radius filler from above the radius filler transport tool, wherein the load state is defined by the trough in a/the trough closed state and at least one, optionally each, hanger assembly in a/the hanger open state.

A3.1. The radius filler transport tool of paragraph A3, wherein the radius filler transport tool in the load state is configured to accept the uncured radius filler placed, dropped, and/or ejected into the trough of the radius filler transport tool from above.

A4. The radius filler transport tool of paragraphs A1-A3.1, wherein the radius filler transport tool has an unload state configured to downwardly unload an/the uncured radius filler from the radius filler transport tool, wherein the unload state is defined by the trough in a/the trough open state and each hanger assembly in a/the hanger open state.

A4.1. The radius filler transport tool of paragraph A4, wherein the uncured radius filler includes, optionally is, composite material and/or fiber-reinforced composite, and optionally wherein the uncured radius filler includes at least one of resin, epoxy, adhesive, carbon fiber, glass fiber, and aramid fiber.

A4.2. The radius filler transport tool of any of paragraphs A4-A4.1, wherein the radius filler transport tool in the unload state is configured to drop, eject, and/or place the uncured radius filler from the trough into a cavity below the radius filler transport tool, optionally wherein the cavity is less than 50 mm, less than 20 mm, less than 10 mm, less than 5 mm, and/or less than 2 mm below the radius filler transport tool.

A4.3. The radius filler transport tool of any of paragraphs A4-A4.2, wherein the radius filler transport tool is configured to rest on a top of a composite structure that defines an elongated cavity.

A4.4. The radius filler transport tool of any of paragraphs A4-A4.3, wherein the radius filler transport tool in the transport state and resting on the top of the composite structure over the elongated cavity is configured to position an/the uncured composite radius filler above the composite structure at distance relative to a local plane of the composite structure of less than 20 mm, less than 10 mm, less than 5 mm, less than 2 mm, greater than 0.1 mm, greater than 0.5 mm, and/or greater than 1 mm.

A5. The radius filler transport tool of any of paragraphs A1-A4.4, wherein the radius filler transport tool has a tool recovery state configured to hold the first trough portion and the second trough portion together by the plurality of hanger assemblies, wherein the tool recovery state is defined by the trough in a/the trough open state and each hanger assembly in a/the hanger closed state.

A6. The radius filler transport tool of any of paragraphs A1-A5, wherein the radius filler transport tool, the first trough portion, the support rail of the first trough portion, the second trough portion, and/or the support rail of the second trough portion is elongated.

A6.1. The radius filler transport tool of paragraph A6, wherein the radius filler transport tool, the first trough portion, and/or the second trough portion is longer than 1 m, longer than 2 m, longer than 3 m, longer than 4 m, longer than 5 m, longer than 10 m, longer than 20 m, longer than 30 m, and/or longer than 40 m.

A6.2. The radius filler transport tool of any of paragraphs A6-A6.1, wherein the support rail of the first trough portion and/or the support rail of the second trough portion is longer than 0.5 m, longer than 1 m, longer than 2 m, longer than 3 m, longer than 4 m, longer than 5 m, shorter than 5 m, shorter than 4 m, shorter than 3 m, shorter than 2 m, and/or shorter than 1 m.

A7. The radius filler transport tool of any of paragraphs A1-A6.2, wherein the first trough portion includes a plurality of support rails.

A8. The radius filler transport tool of any of paragraphs A1-A7, wherein the second trough portion includes a plurality of support rails.

A9. The radius filler transport tool of any of paragraphs A1-A8, wherein the support rail of the first trough portion, the first contact tip, the support rail of the second trough portion, and/or the second contact tip is configured for non-damaging contact with an/the uncured radius filler.

A9.1. The radius filler transport tool of paragraph A9, wherein the support rail of the first trough portion, the first contact tip, the support rail of the second trough portion, and/or the second contact tip is configured to avoid contaminating, sticking to, and/or negatively impacting the uncured radius filler.

A10. The radius filler transport tool of any of paragraphs A1-A9.1, wherein the first trough portion, the support rail of the first trough portion, the first contact tip, the second trough portion, the support rail of the second trough portion, and/or the second contact tip includes at least one of plastic, polyethylene, UHMW polyethylene, metal, aluminium, fluoropolymer, PTFE, FEP, EFTE, and silicone.

A11. The radius filler transport tool of any of paragraphs A1-A10, wherein the support rail of the first trough portion, the first contact tip, the support rail of the second trough portion, and/or the second contact tip includes at least one of a release coating, a release film, and a dry release surface.

A12. The radius filler transport tool of any of paragraphs A1-A11, wherein the trough in the trough closed state has a length that is longer than 1 m, longer than 2 m, longer than 3 m, longer than 4 m, longer than 5 m, longer than 10 m, longer than 20 m, longer than 30 m, and/or longer than 40 m.

A13. The radius filler transport tool of any of paragraphs A1-A12, wherein the trough in the trough closed state is defined between the first contact tip and the second contact tip.

A14. The radius filler transport tool of any of paragraphs A1-A13, wherein the first trough portion includes a plurality of bases, optionally spaced apart along a length of the first trough portion by an average spacing that optionally is at least 0.2 m, at least 0.5 m, at least 1 m, at least 2 m, about 0.5 m, about 1 m, at most 10 m, at most 5 m, at most 2 m, and/or at most 1 m; and wherein the second trough portion includes a plurality of bases, optionally spaced apart along a length of the second trough portion by an average spacing that optionally is at least 0.2 m, at least 0.5 m, at least 1 m, at least 2 m, about 0.5 m, about 1 m, at most 10 m, at most 5 m, at most 2 m, and/or at most 1 m.

A14.1. The radius filler transport tool of paragraph A14, wherein the plurality of bases of the first trough portion and the plurality of bases of the second trough portion are configured to align with each other.

A14.2. The radius filler transport tool of any of paragraphs A14-A14.1, wherein average spacing of the plurality of bases of the first trough portion is equal to the average spacing of the plurality of bases of the second trough portion.

A15. The radius filler transport tool of any of paragraphs A1-A14.2, wherein the radius filler transport tool, optionally when the trough is in the trough closed state, is configured to stably rest on a flat surface, optionally with the base of the first trough portion and the base of the second trough portion contacting the flat surface.

A16. The radius filler transport tool of any of paragraphs A1-A15, wherein the base of the first trough portion includes a foot and/or wherein the base of the second trough portion includes a foot.

A16.1. The radius filler transport tool of paragraph A16, wherein the foot of the first trough portion and/or the foot of the second trough portion is configured to contact uncured composite materials without damage to the uncured composite materials, and optionally is configured for sliding contact with uncured composite materials.

A16.2. The radius filler transport tool of any of paragraphs A16-A16.1, wherein the foot of the first trough portion and/or the foot of the second trough portion includes at least one of plastic, polyethylene, UHMW polyethylene, metal, aluminium, fluoropolymer, PTFE, FEP, EFTE, and silicone.

A16.3. The radius filler transport tool of any of paragraphs A16-A16.2, wherein the foot of the first trough portion and/or the foot of the second trough portion includes at least one of a release coating, a release film, and a dry release surface.

A16.4. The radius filler transport tool of any of paragraphs A16-A16.3, wherein the foot of the first trough portion and/or the foot of the second trough portion is at a/the bottom of the radius filler transport tool.

A17. The radius filler transport tool of any of paragraphs A1-A16.4, wherein each hanger assembly includes a first arm coupler and a second arm coupler.

A17.1. The radius filler transport tool of paragraph A17, wherein, in at least the hanger closed state, the first arm is pivotably, and optionally releasably, coupled to the first trough portion by the first arm coupler.

A17.2. The radius filler transport tool of any of paragraphs A17-A17.1, wherein, in at least the hanger closed state, the second arm is pivotably, and optionally releasably, coupled to the second trough portion by the second arm coupler.

A17.3. The radius filler transport tool of any of paragraphs A17-A17.2, wherein the first arm coupler and/or the second arm coupler includes at least one of a pin, a clamp, a clasp, a bolt, a hinge, a magnet, an actuator, a hook, a ring, a carabiner, a link, a loop, and an eyelet.

A18. The radius filler transport tool of any of paragraphs A1-A17.3, wherein, in the hanger open state, the first arm is released from the first trough portion and/or the second arm is released from the second trough portion.

A19. The radius filler transport tool of any of paragraphs A1-A18, wherein, in the hanger open state, the first arm is released from the second arm.

A20. The radius filler transport tool of any of paragraphs A1-A19, wherein at least one, optionally each, hanger assembly includes a central hanger coupler.

A20.1. The radius filler transport tool of paragraph A20, wherein, in the hanger closed state, the first arm and the second arm are releasably coupled together by the central hanger coupler.

A20.2. The radius filler transport tool of any of paragraphs A20-A20.1, wherein the central hanger coupler includes at least one of a pin, a clamp, a clasp, a bolt, a hinge, a magnet, an actuator, a hook, a ring, a carabiner, a link, a loop, and an eyelet.

A21. The radius filler transport tool of any of paragraphs A1-A20.2, wherein at least one, optionally each, hanger assembly includes a hanging coupler.

A21.1. The radius filler transport tool of paragraph A21, wherein the hanging coupler is configured to releasably couple the hanger assembly to a transport mechanism above the radius filler transport tool.

A21.2. The radius filler transport tool of any of paragraphs A21-A21.1, wherein the hanging coupler is configured to hang the radius transport tool.

A21.3. The radius filler transport tool of any of paragraphs A21-A21.2, wherein the hanging coupler includes, and optionally is, at least one of a hook, a ring, a carabiner, a link, a catch, a clasp, a grapple, a loop, a strap, a tether, and an eyelet.

A22. The use of the radius filler transport of any of paragraphs A1-A21.3 to index, to transport, and/or to place an uncured radius filler.

A23. The use of the radius filler transport of any of paragraphs A1-A21.3 to place an uncured radius filler into a cavity formed at the intersection of two uncured composite sheets.

B1. A method for handling an uncured radius filler, the method comprising:

loading the uncured radius filler into a radius filler transport tool by placing the uncured radius filler into the radius transport tool from above; and unloading the uncured radius filler from the radius filler transport tool by dropping the uncured radius filler from the radius filler transport tool.

B2. The method of paragraph B1, wherein the radius filler transport tool is the radius filler transport tool of any of paragraphs A1-A21.3 and/or includes a trough with a trough closed state and a trough open state, and a plurality of hanger assemblies configured to transversely span the trough, wherein each hanger assembly has a hanger closed state and a hanger open state.

B2.1. The method of paragraph B2, wherein the loading includes, at least one of before and during the placing, setting each hanger assembly into the hanger open state.

B2.2. The method of any of paragraphs B2-B2.1, wherein the loading includes, at least one of before and during the placing, transitioning each hanger assembly from the hanger closed state to the hanger open state, and wherein the loading includes, at least one of during and after the placing, transitioning each hanger assembly from the hanger open state to the hanger closed state.

B2.3. The method of any of paragraphs B2-B2.2, wherein the placing is performed while at least one, optionally each, of the hanger assemblies is in the hanger open state.

B2.4. The method of any of paragraphs B2-B2.3, wherein the loading includes, at least one of before and during the placing, releasing and/or removing the plurality of hanger assemblies to expose an open top of the trough.

B2.5. The method of any of paragraphs B2-B2.4, wherein the loading includes, at least one of after and during the placing, setting each hanger assembly into the hanger closed state.

B2.6. The method of any of paragraphs B2-B2.5, wherein the loading includes, at least one of after and during the placing, securing and/or replacing the plurality of hanger assemblies to support the radius filler transport tool.

B2.7. The method of any of paragraphs B2-B2.6, wherein the loading includes, before the placing, setting the trough into the trough closed state.

B2.8. The method of any of paragraphs B2-B2.7, wherein the loading is performed while the trough is in the trough closed state.

B2.9. The method of any of paragraphs B2-B2.8, wherein the placing includes placing the uncured radius filler into the trough.

B2.10. The method of any of paragraphs B2-B2.9, further comprising, before the unloading, hanging the radius filler transport tool by the plurality of hanger assemblies.

B2.11. The method of any of paragraphs B2-B2.10, wherein the unloading includes, at least one of before and during the dropping, setting the trough into the trough open state.

B2.12. The method of any of paragraphs B2-B2.11, wherein the unloading includes, at least one of before and during the dropping, transitioning the trough from the trough closed state to the trough open state while at least one of the hanger assemblies is in the hanger closed state.

B2.13. The method of any of paragraphs B2-B2.12, wherein the unloading is performed while the trough is in the trough open state.

B2.14. The method of any of paragraphs B2-B2.13, wherein the unloading includes, at least one of before and during the dropping, releasing the base of the first trough portion from the base of the second trough portion.

B2.15. The method of any of paragraphs B2-B2.14, further comprising, after the dropping, setting the trough into the trough closed state.

B2.16. The method of any of paragraphs B2-B2.15, further comprising, after the dropping, coupling the base of the first trough portion to the base of the second trough portion.

B2.17. The method of any of paragraphs B2-B2.16, wherein the dropping includes dropping the uncured radius filler between the first trough portion and the second trough portion, and/or between the trough panel of the first trough portion and the trough panel of the second trough portion.

B2.18. The method of any of paragraphs B2-B2.17, wherein the dropping includes dropping the uncured radius filler less than 50 mm, less than 20 mm, less than 10 mm, less than 5 mm, and/or less than 2 mm.

B2.19. The method of any of paragraphs B2-B2.18, wherein the dropping includes dropping the uncured radius filler in the same orientation as it was in the radius filler transport tool prior to the dropping and/or at the placing.

B2.20. The method of any of paragraphs B2-B2.19, wherein the dropping includes dropping the uncured radius filler without significantly warping, kinking, and/or twisting the uncured radius filler.

B3. The method of any of paragraphs B1-B2.20, wherein the uncured radius filler is longer than 1 m, longer than 2 m, longer than 3 m, longer than 4 m, longer than 5 m, longer than 10 m, longer than 20 m, longer than 30 m, and/or longer than 40 m.

B4. The method of any of paragraphs B1-B3, wherein the uncured radius filler has a cross sectional area that is less than 10 $cm^2$, less than 3 $cm^2$, less than 2 $cm^2$, less than 1 $cm^2$, less than 0.5 $cm^2$, less than 0.2 $cm^2$, greater than 0.1 $cm^2$, greater than 0.2 $cm^2$, and/or greater than 0.5 $cm^2$.

B5. The method of any of paragraphs B1-B4, wherein the uncured radius filler has a/the tip with a width of less than 10 mm, less than 3 mm, less than 1 mm, greater than 0.01 mm, and/or greater than 0.1 mm.

B6. The method of any of paragraphs B1-B5, wherein the uncured radius filler includes, optionally is, fiber-reinforced composite, and optionally wherein the uncured radius filler includes at least one of carbon fiber, glass fiber, and aramid fiber.

B7. The method of any of paragraphs B1-B6, further comprising transporting the uncured radius filler in the radius filler transport tool B7.1. The method of paragraph B7, wherein the transporting includes transporting the uncured radius filler in the radius filler transport tool to a cavity and aligning the uncured radius filler above the cavity.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, the phrases "at least one of" and "one or more of," in reference to a list of more than one entity, means any one or more of the entities in the list of entities, and is not limited to at least one of each and every entity specifically listed within the list of entities. For example, "at least one of A and B" (or, equivalently, "at least one of A or B," or, equivalently, "at least one of A and/or B") may refer to A alone, B alone, or the combination of A and B.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the singular forms "a", "an" and "the" may be intended to include the plural forms as well, unless the context clearly indicates otherwise.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

The various disclosed elements of apparatuses and steps of methods disclosed herein are not required of all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A radius filler transport tool comprising:
   a first trough portion and a second trough portion that are configured to align to form a trough, wherein the first trough portion includes a support rail and a base, wherein the second trough portion includes a support rail and a base, wherein the support rail of the first trough portion has a first contact tip and the support rail of the second trough portion has a second contact tip, and wherein the first contact tip and the second contact tip are configured to contact a radius filler supported between the first contact tip and the second contact tip; and
   a plurality of hanger assemblies configured to transversely span the trough, wherein each hanger assembly includes a first arm and a second arm, wherein the first arm is configured to couple the hanger assembly to the first trough portion, and wherein the second arm is configured to couple the hanger assembly to the second trough portion;
   wherein the trough has a trough closed state and a trough open state, wherein, in the trough closed state, the first contact tip and the second contact tip are separated by a radius filler retention gap that is sized to retain a tip of an uncured radius filler between the first contact tip and the second contact tip, and wherein, in the trough open state, the first contact tip and the second contact tip are separated by a radius filler clearance gap that is greater than the radius filler retention gap and that is sized to permit the uncured radius filler to exit the trough through the radius filler clearance gap; and
   wherein each hanger assembly has a hanger closed state and a hanger open state, wherein, in the hanger closed state, the first arm is coupled to the first trough portion, the second arm is coupled to the second trough portion, and the hanger assembly transversely spans the trough, and wherein, in the hanger open state, the first arm is released from at least one of the first trough portion and the second arm.

2. The radius filler transport tool of claim 1, wherein, in the trough open state, the first trough portion is disconnected from the second trough portion.

3. The radius filler transport tool of claim 1, wherein the radius filler transport tool has a transport state configured to hold the uncured radius filler in the trough between the first trough portion and the second trough portion, wherein the transport state is defined by the trough in the trough closed state and each hanger assembly in the hanger closed state.

4. The radius filler transport tool of claim 1, wherein the radius filler transport tool has a load state configured to load the uncured radius filler from above the radius filler transport tool, wherein the load state is defined by the trough in the trough closed state and at least one hanger assembly in the hanger open state.

5. The radius filler transport tool of claim 1, wherein the radius filler transport tool has an unload state configured to downwardly unload the uncured radius filler from the radius filler transport tool, wherein the unload state is defined by the trough in the trough open state and each hanger assembly in the hanger open state.

6. The radius filler transport tool of claim 1, wherein the radius filler transport tool has a tool recovery state configured to hold the first trough portion and the second trough portion together by the plurality of hanger assemblies, wherein the tool recovery state is defined by the trough in the trough open state and each hanger assembly in the hanger closed state.

7. The radius filler transport tool of claim 1, wherein, in the hanger open state, the first arm is released from the first trough portion.

8. The radius filler transport tool of claim 1, wherein each hanger assembly includes a first arm coupler and a second arm coupler.

9. The radius filler transport tool of claim 8, wherein, in at least the hanger closed state, the first arm is releasably coupled to the first trough portion by the first arm coupler; and wherein, in at least the hanger closed state, the second arm is coupled to the second trough portion by the second arm coupler.

10. The radius filler transport tool of claim 1, wherein the first contact tip of the support rail of the first trough portion and the second contact tip of the support rail of the second trough portion are configured for non-damaging contact with an uncured radius filler.

11. The radius filler transport tool of claim 1, wherein the first trough portion includes a plurality of bases, spaced apart along a length of the first trough portion, and wherein the second trough portion includes a plurality of bases, spaced apart along a length of the second trough portion.

12. The radius filler transport tool of claim 1, wherein the base of the first trough portion includes a foot, wherein the base of the second trough portion includes a foot, and wherein the foot of the first trough portion and the foot of the second trough portion are configured for sliding contact with uncured composite materials without damage to the uncured composite materials.

13. The radius filler transport tool of claim 1, wherein each hanger assembly includes a hanging coupler configured to hang the radius transport tool.

* * * * *